(12) United States Patent
Schmit et al.

(10) Patent No.: US 11,617,972 B2
(45) Date of Patent: Apr. 4, 2023

(54) LAUNDER COVER AND COVER SYSTEM AND PROCESSES TO MAKE LAUNDER COVER ASSEMBLIES

(71) Applicant: Enduro Composites, Inc, Houston, TX (US)

(72) Inventors: Kevin George Schmit, Houston, TX (US); Gustavo Barbera, Houston, TX (US); Rohit Joshi, Houston, TX (US)

(73) Assignee: Enduro Composites, Inc, Houston, TX (US)

(*) Notice: Subject to any disclaimer, the term of this patent is extended or adjusted under 35 U.S.C. 154(b) by 0 days.

(21) Appl. No.: 17/362,382

(22) Filed: Jun. 29, 2021

(65) Prior Publication Data

US 2021/0402330 A1    Dec. 30, 2021

Related U.S. Application Data

(60) Provisional application No. 63/045,309, filed on Jun. 29, 2020.

(51) Int. Cl.
*B01D 21/24* (2006.01)
*B01D 21/00* (2006.01)

(52) U.S. Cl.
CPC ..... *B01D 21/0042* (2013.01); *B01D 21/0003* (2013.01); *B01D 21/0006* (2013.01); *B01D 21/2433* (2013.01)

(58) Field of Classification Search
CPC ............ B01D 21/0003; B01D 21/0006; B01D 21/0042; B01D 21/2444
USPC ...................... 210/521, 532.1, 540, 541, 542
See application file for complete search history.

(56) References Cited

U.S. PATENT DOCUMENTS

| | | | |
|---|---|---|---|
| 4,582,601 A | | 4/1986 | Strow et al. |
| 4,767,536 A | * | 8/1988 | Roley ................ B01D 21/2444 210/532.1 |
| 5,670,045 A | | 9/1997 | Schaller |
| 5,744,093 A | | 4/1998 | Davis |
| 5,965,023 A | * | 10/1999 | Schaller ............. B01D 21/2444 210/540 |
| 6,712,222 B2 | | 3/2004 | Schaller |
| 9,174,148 B2 | | 11/2015 | Schaller |
| 11,052,329 B1 | * | 7/2021 | Janssen ............. B01D 21/0006 |
| 2016/0236116 A1 | * | 8/2016 | Schaller ............ B01D 21/0006 |
| 2018/0036654 A1 | * | 2/2018 | Schaller ............ B01D 21/2444 |
| 2021/0046404 A1 | * | 2/2021 | Morgan ............ B01D 21/2444 |

OTHER PUBLICATIONS

International Search Report and Written Opinion dated Sep. 30, 2021 issued for International Application No. PCT/US2021/39603.

\* cited by examiner

*Primary Examiner* — Christopher Upton

(74) *Attorney, Agent, or Firm* — Hunton Andrews Kurth LLP

(57) ABSTRACT

The instant launder cover is readily fabricated by pultrusion, vacuum bag, or other non-sprayed methods and may advantageously be used with various sizes of tanks and/or launder troughs. The cover system effectively controls odor using, for example, optional gaskets while not requiring stiffening flanges or interfering with wiper mechanisms or other components of the tank or system.

18 Claims, 10 Drawing Sheets

General design concept using a pultruded part with gasket at scum baffle for odor control and/or UV protection LAUNDER COVER ARRANGEMENT
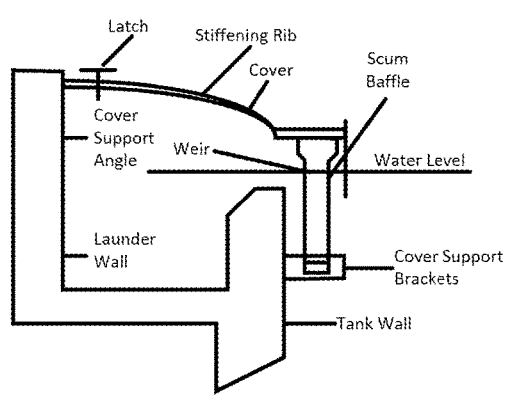
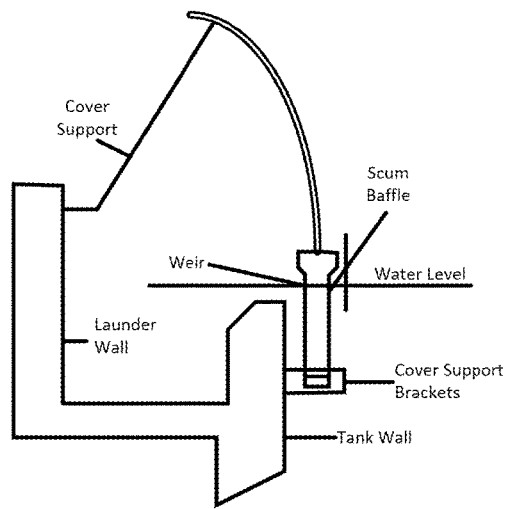
Figure 1B
Figure 1C General concept of the pultruded part with inner arc to match the launder trough.

General design concept using a pultruded part with gasket at scum baffle for odor control and/or UV protection Additional detail of gasket at scum baffle.

Pultruded panel installation details.

Overlapping "flap" or "brush" gasket to allow for independent adjustment to fit various tank diameters.

Possible standard design for a launder cover option #6

LAUNDER COVER AND COVER SYSTEM AND PROCESSES TO MAKE LAUNDER COVER ASSEMBLIES

CROSS-REFERENCE TO RELATED APPLICATIONS

The instant application claims priority to U.S. Ser. No. 63/045,309 filed Jun. 29, 2020 which application is incorporated herein by reference.

FIELD OF THE INVENTION

This invention is related to launder covers used in, for example, wastewater treatment plants as covers for launder troughs.

BACKGROUND AND SUMMARY OF THE INVENTION

Historically, launder covers used in wastewater treatment tanks are custom sized for a particular tank. Accordingly, the manufacturing process typically entails making a custom mold which is a negative image of the tank cover to be manufactured. After applying a mold release agent, resin, glass, and/or any additives are then applied inside the mold to build up the cover. Once completed and cured the cover is separated from the mold using with wedges and/or compressed air. Typical prior art launder cover systems are described in, for example, U.S. Pat. Nos. 5,670,045; 5,744,093; 6,712,222; and 9,174,148 each of which is incorporated herein by reference.

Unfortunately, such prior art cover systems are expensive, time-consuming, and excessively wasteful to manufacture and/or fabricate, can only be used with a specific size tank diameter and a specific size launder trough, and often require stiffening flanges which add to the cost. Furthermore, such prior art cover systems often do not effectively control odor and/or interfere with other parts of the tank such as wiper mechanisms. What is needed is a launder cover that is more readily manufactured and/or fabricated and may be used with various sizes of tanks and/or launder troughs. It would further be beneficial if the cover effectively controlled odor and/or does not interfere with wiper mechanisms and other components of the system. Advantageously, the present launder cover panel assembly may accomplish at least one up to all of the aforementioned benefits.

In one embodiment the launder cover panel assembly is for covering at least a portion of a launder trough channel of a clarifier tank having a launder wall and a weir wall defining a width of the launder trough. The launder cover panel assembly may comprise a first substantially horizontal planar surface configured to be mounted to the clarifier tank. An arced or ridged or other sloped surface is usually adjacent the substantially horizontal planar surface. The arced or ridged or other sloped surface typically terminates in a second substantially horizontal planar surface and the arced or ridged or sloped surface is configured to cover at least a majority of the width of a portion of the launder trough. In some embodiments the arced or ridged or other sloped surface may cover the entire width of a portion of the launder and not require a second substantially planar surface. In some embodiments the launder cover panel assembly is pultruded. In some embodiments the launder cover is made via vaccum bagging, i.e., vacuum bag laminating. The launder cover may be adjustable to fit tank diameters from about 40, or from about 60 feet to about 150, or to about 175 feet, and/or may be adjustable to fit launder troughs ranging from about 18 inches to about 30 inches wide. In some embodiments the launder cover may comprise a gasket for odor control. In some embodiments the launder cover may be configured to be substantially inside or completely inside the scum baffle panel which prevents or limits interference with a wiper mechanism in a clarifier tank. In some embodiments the launder cover eliminates the need to employ stiffening flanges.

The radius of curvature of the arced or sloped surface 20 may vary depending upon a number of factors. Further, in some embodiments the arced or sloped surface 20 may be ridged to employ substantially 90 degree, e.g., 75-110 degree angles instead of the arced or sloped design.

BRIEF DESCRIPTION OF THE DRAWINGS

FIG. 1B is a portion of launder cover system's perimeter showing the cover closed.

FIG. 1C is a portion of launder cover system's perimeter showing the cover open.

DETAILED DESCRIPTION

In general the application pertains to a launder cover panel assembly for covering at least a portion of a launder trough channel of a clarifier tank. Such cover assemblies are generally desired to prevent or control algae growth as well as to act as weather and debris barriers and control odors. The clarifier tanks typically have a launder wall and a weir wall which define a width of the launder trough.

Figure 5:
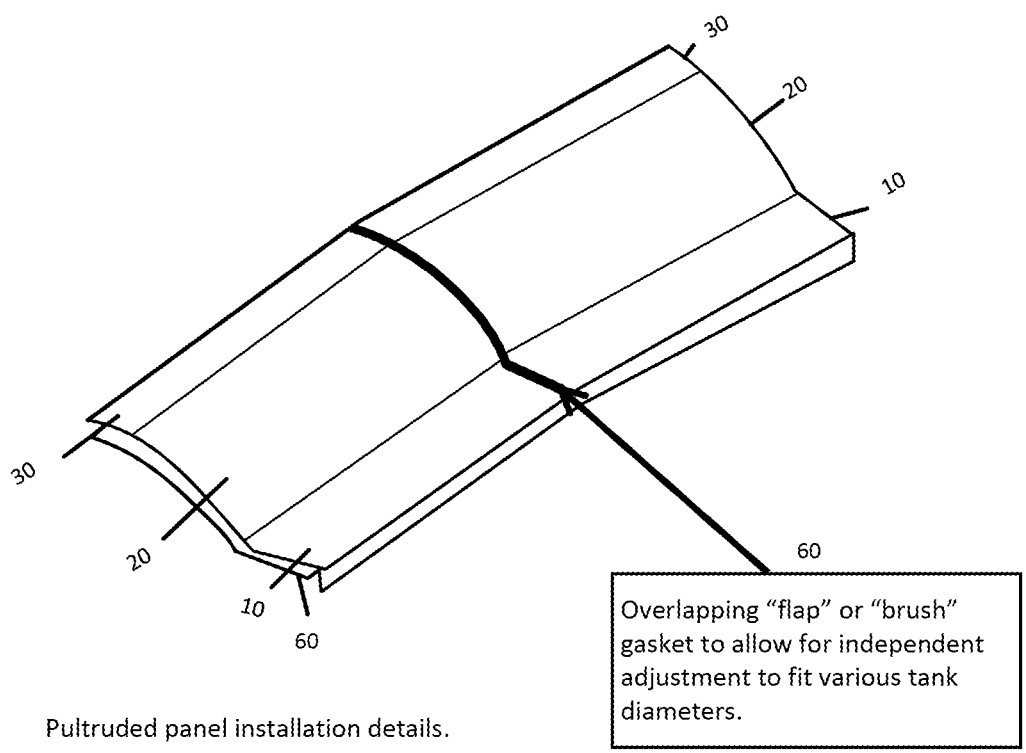
FIG. 5 shows two adjacent cover panel assemblies with an overlapping flap or brush to accommodate various tank diameters and may be made using, e.g., pultrusion or vacuum bagging.
Figure 6:
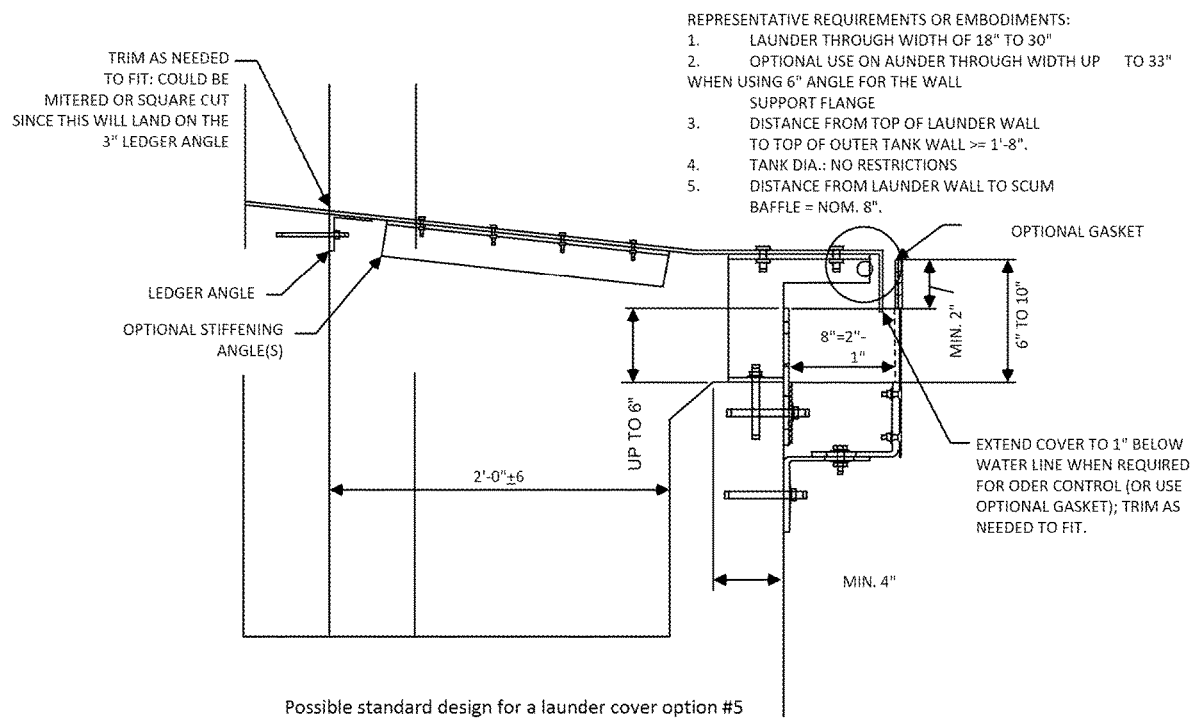
FIG. 6 shows a representative launder cover and dimensions.
Figure 7:
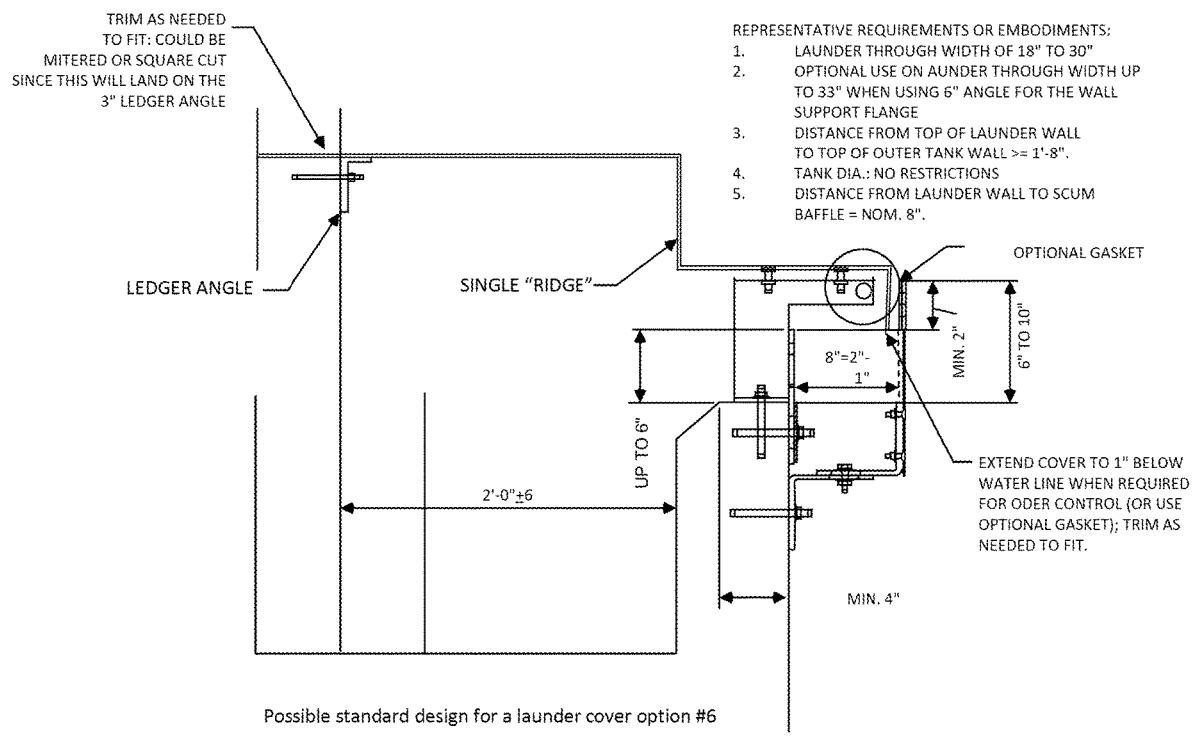
FIG. 7 shows a representative launder cover and dimensions.

In some embodiments the launder cover panel assembly comprises a first substantially horizontal planar surface configured to be mounted to the clarifier tank. An exemplary embodiment is shown as 10 in FIGS. 2, 3, and 5. The specific size, shape, dimensions, and material for the first substantially horizontal planar surface may vary depending upon the desired application, the specific tank, launder trough to be covered, and desired results. In some embodiments the material employed for the first substantially horizontal planar surface and/or the arced or ridged or sloped surface and/or second substantially horizontal planar surface is a resin alone or a mixture of resin with glass and/or other additives, e.g., fiberglass.

The first substantially horizontal planar surface 10 configured to be mounted to the clarifier tank, as well as the arced or ridged or other sloped surface 20, and second substantially horizontal planar surface 30 may vary in dimensions depending upon, for example, the launder trough width, tank diameter, launder wall thickness, vertical distance from top of launder wall to top of weir panel and to top of scum baffle panel, horizontal distance from launder wall to scum baffle panel. In some embodiments the first substantially horizontal planar surface 10 is from at least about 8, or at least about 10, or at least about 11 or at least about 12 inches up to about 24, or up to about 15, or up to about 14 inches in length. The width of the first substantially horizontal planar surface 10 also may vary. In some embodiments the width is from at least about 12, or at least about 24 or at least about 50 inches up to about 96, or up to about 80 inches.

Similarly, the thickness of the first substantially horizontal planar surface 10 configured to be mounted to the clarifier tank, as well as the arced or ridged or sloped surface 20, and second substantially horizontal planar surface 30 can be the same or different for each portion or even vary along a portion depending upon the material employed and desired properties. In some instances the thickness of the first substantially horizontal planar surface 10, the arced or ridged or sloped surface 20, and second substantially horizontal planar surface 30 are substantially the same while in other embodiments the thicknesses may vary. Typical thicknesses range from 3/16 of an inch to about 3/8 of an inch with a nominal 1/4 inch being preferable in some embodiments.

The arced or ridged or sloped surface 20 adjacent the first substantially horizontal planar surface 10 and the second substantially horizontal planar surface 30 have a perimeter, thickness, and width that varies depending upon the other characteristics as described above. For example, the arced or ridged or sloped surface 20 may have a perimeter similar to the width described above and in some embodiments may be from about 12 inches to 96 inches, or from about 50 to about 70 inches. Similarly, the second substantially horizontal planar surface 30 may be from about 6 to about 12 inches in length.

Figure 1A:
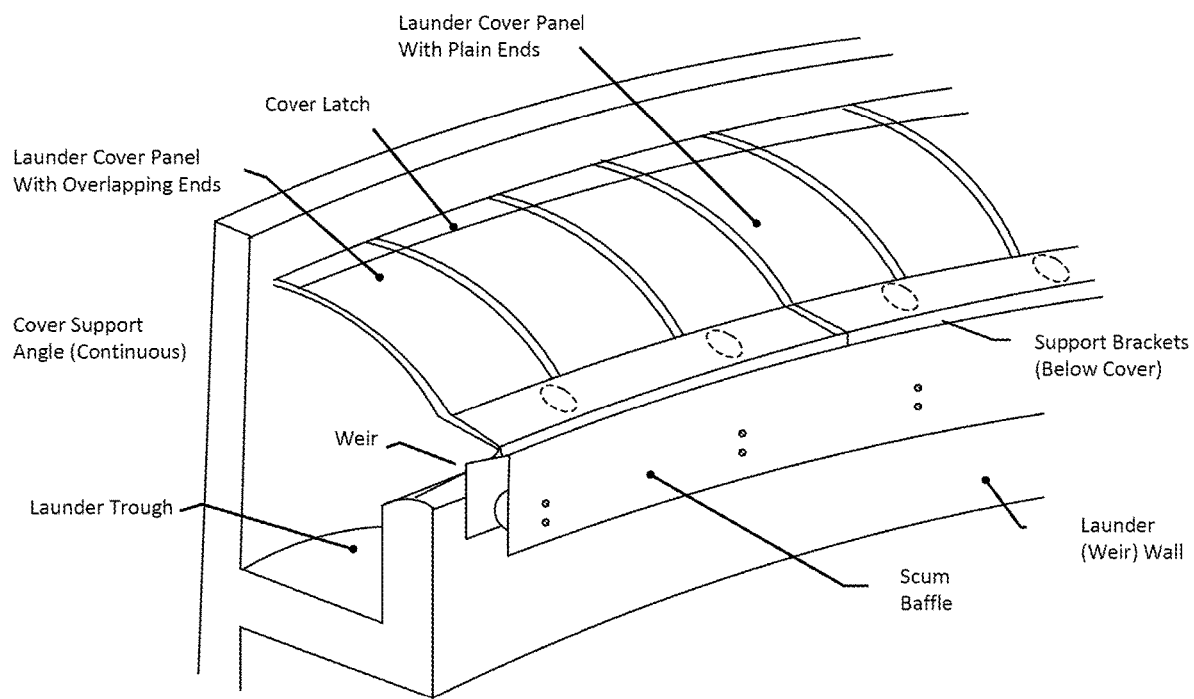
FIG. 1A is a perspective view of a portion of launder cover system's perimeter.
Figure 2:
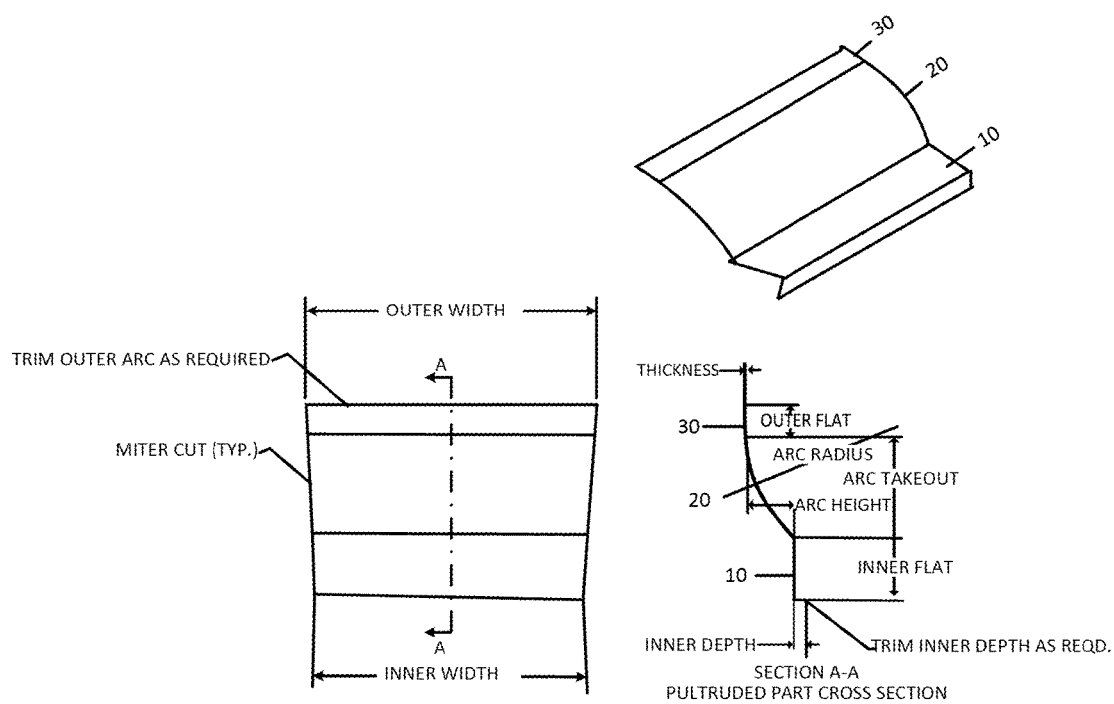
FIG. 2 shows various views of a representative pultruded assembly embodiment with inner arc.

In some embodiments the launder cover panel assembly has an outer width which is the same as the inner width while in a preferred embodiment the outer width is larger or smaller than the inner width. As shown in, for example, FIG. 2 the outer width is larger as the assembly width tapers on one or both sides. While FIG. 2 is described as a pultruded part it may may be by any convenient methods, e.g., vacuum bagging. Typically the outer width may be from about 12 to about 96 inches, or from about 50 to about 70 inches while the inner width may be the same or slightly smaller, for example, from about 12 to about 96 inches, or from about 45 to about 65 inches.

Figure 8:
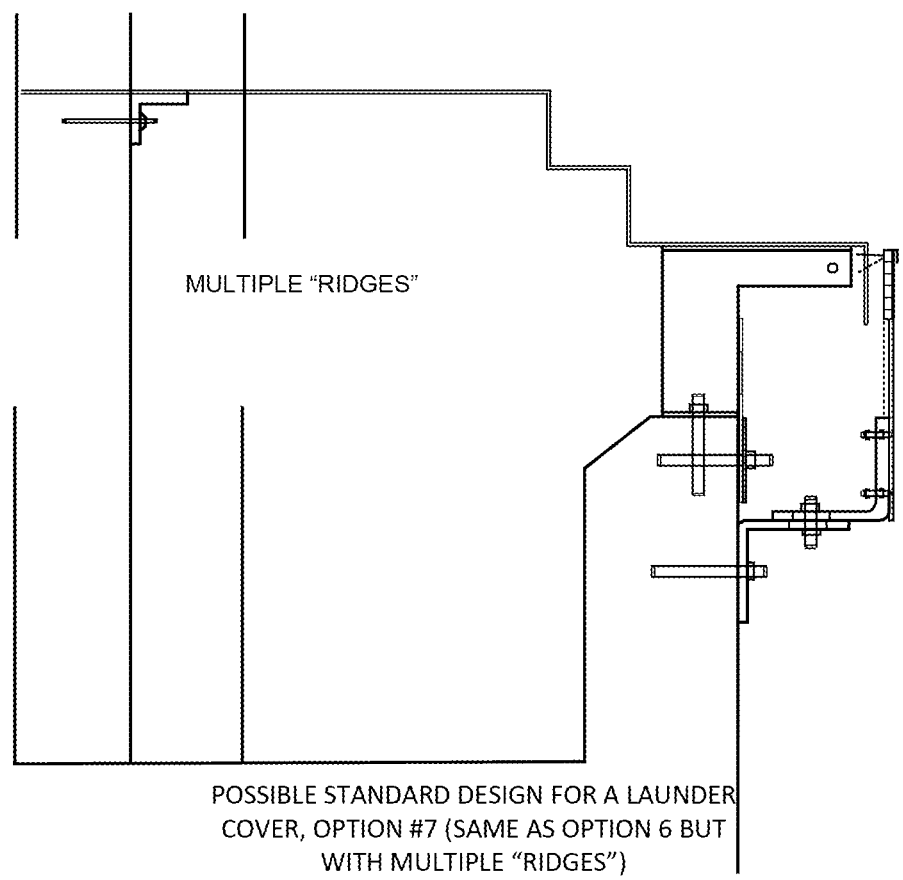
FIG. 8 shows a representative launder cover with multiple ridges.
Figure 9:
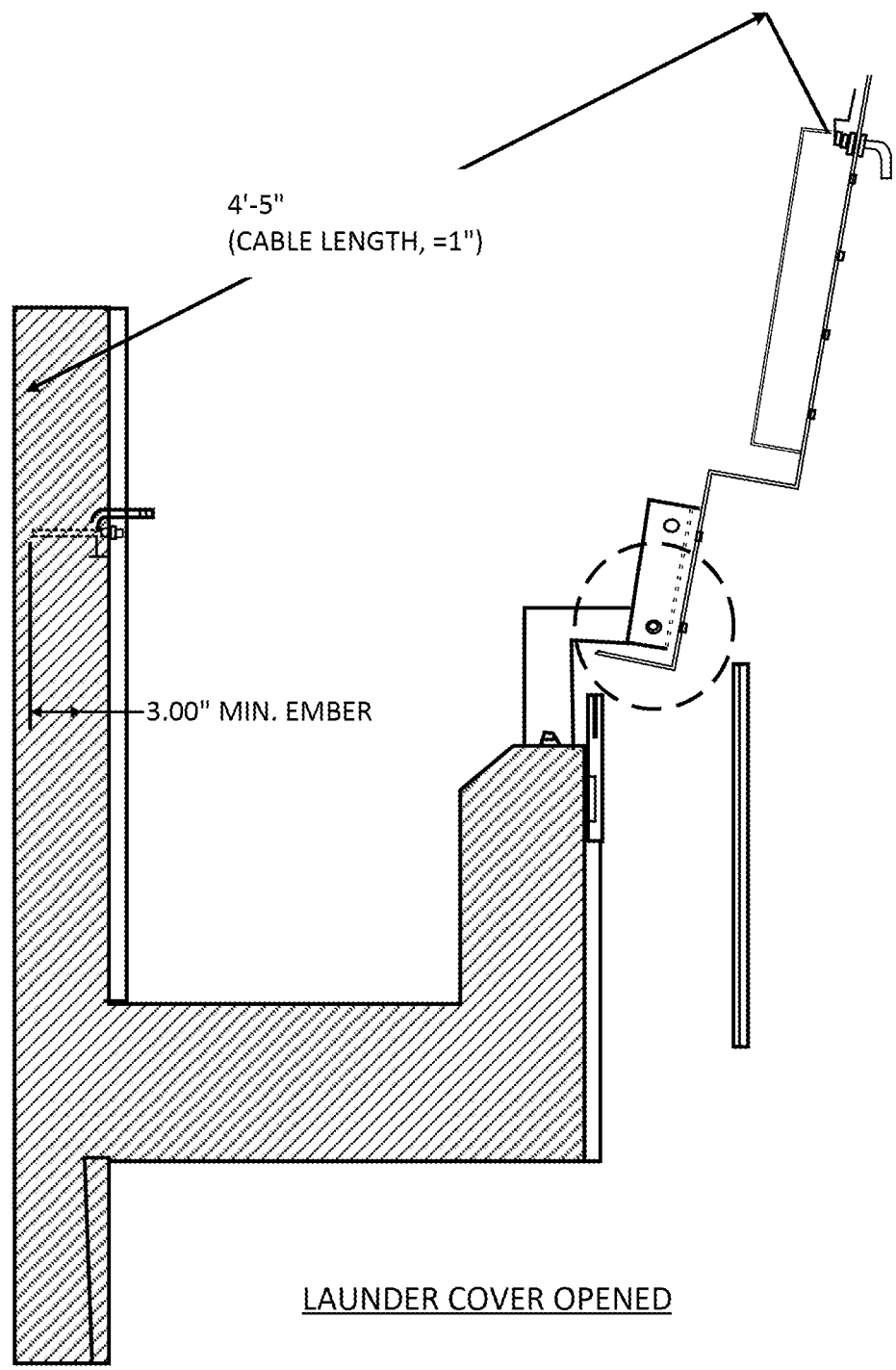
FIG. 9 shows a representative ridged launder cover in an open position.

The arced or ridged or sloped surface 20 is usually configured to cover at least a majority of the width of at least a portion of the launder trough perimeter. In a preferred embodiment the arced or ridged or sloped surface 20 is configured to cover at least 70%, or at least 90%, up to 100% of the width of at least a portion of the launder trough perimeter. The radius of curvature of the arced or ridged or sloped surface 20 may vary depending upon a number of factors. Further, in some embodiments the arced or ridged or sloped surface 20 may employ substantially 90 degree angles instead of the arced or ridged or sloped design. An exemplary embodiment in shown in FIG. 8 with multiple ridges. FIG. 9 shows a ridged launder cover in an open position. When the hinged launder cover is closed it may rest upon the protruding flange on the left side of FIG. 9. The L-shaped handle at the end of the launder cover opposite the hinge may in some embodiments be spring loaded.

The launder cover panel assembly may advantageously be made such that it is adjustable and fits a variety of tanks and launder trough widths simply by trimming the first and/or second substantially horizontal planar surface. In some embodiments the launder cover panel assembly may be configured for a tank diameter of from about 40 feet to about 175 feet, preferably from about 60 feet to about 150 feet. Similarly, in some embodiments the launder cover panel assembly may be configured for a launder trough width of from about 12 inches to about 36 inches, preferably from about 18 inches to about 30 inches.

Advantageously, the launder cover panel assembly may be configured to be substantially within a scum baffle panel, if present. In this manner the assembly advantageously is free from contacting or otherwise interfering with any machinery or devices that may be present in the clarifier tank such as a wiper mechanism.

The launder cover panel assembly may be manufactured in any convenient manner and the preferred manufacturing method may vary depending upon the materials employed, the specific dimensions, and the desired properties of the launder cover panel assembly. One particularly preferable manner of manufacturing the launder cover panel assembly is pultrusion to obtain a pultruded launder cover panel assembly. Pultrusion typically employs reinforcement materials like glass fibers impregnated with a thermoset resin such as an epoxy, polyester, or polyurethane and pulls them through a heated die to polymerize the resin. Pultrusion also usually creates less waste from overspray which is a general characteristic of spray up and hand lay up manufacturing. Vacuum bagging construction may be employed herein as it shares many of the same benefits as pultrusion while also avoiding overspray that is typical in spray up and hand lay up manufacturing.

Figure 3:
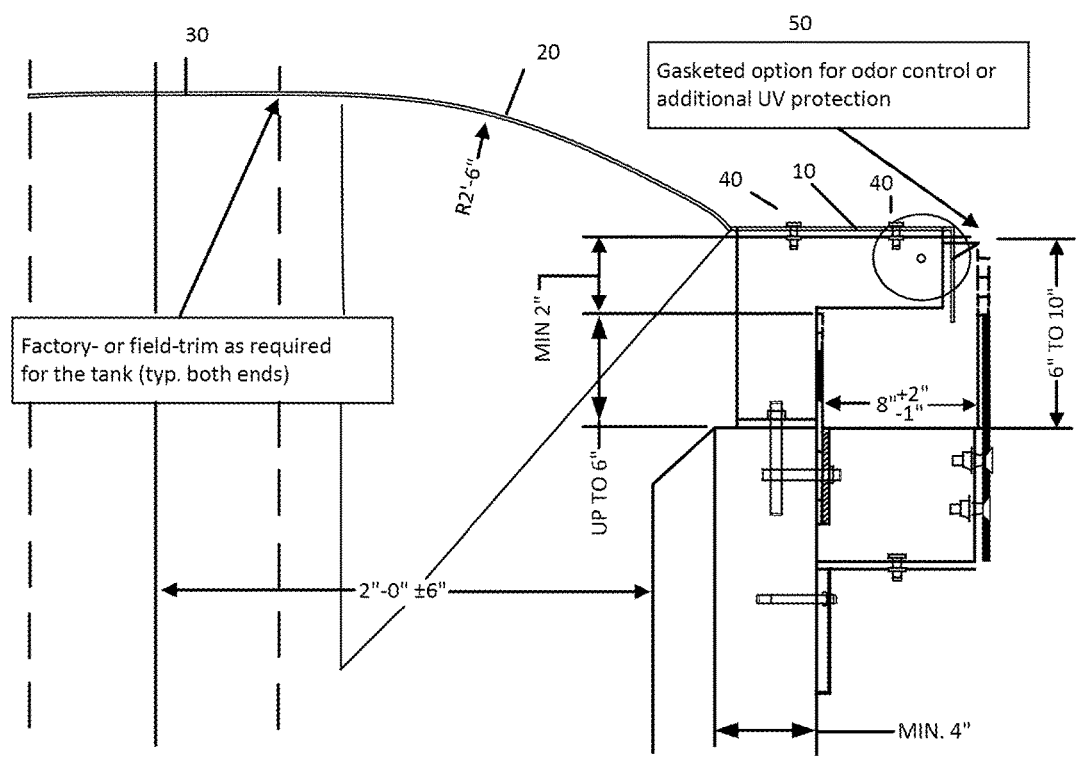
FIG. 3 shows a pultruded assembly of representative dimensions.
Figure 4:
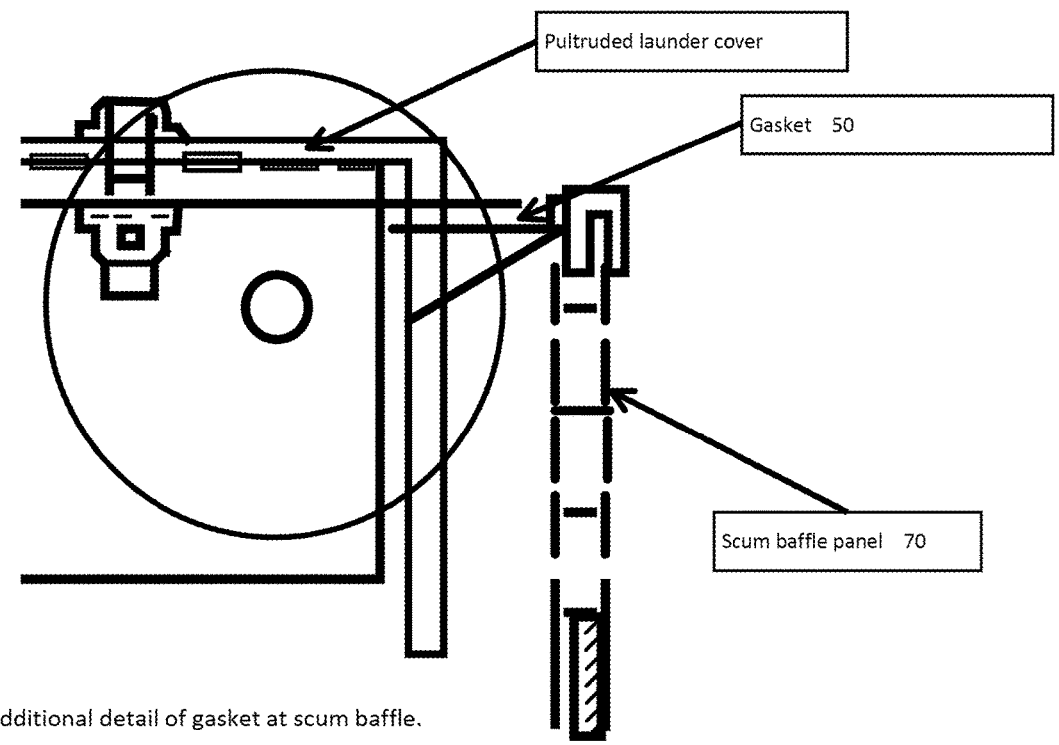
FIG. 4 shows a gasket embodiment of a pultruded assembly which may also be made using, e.g., vacuum bagging.

The launder cover panel assembly may be mounted in any convenient manner to cover the launder trough portion as desired. In some embodiments the first substantially horizontal planar surface 10 is configured to be mounted to the weir wall in some manner, e.g., either directly or in some embodiments via a bracket or other device which is attached to the weir wall. In other embodiments the first substantially horizontal planar surface 10 may be configured to be attached to the launder wall e.g., either directly or in some embodiments via a bracket or other device which is attached to the launder wall. Any suitable attachment mechanism may be employed. In one embodiment bolts 40 are employed through the first substantially horizontal planar surface 10 near the weir wall on the interior as shown in FIG. 3. The number of brackets per panel may vary and in most cases there are one. Or two, or three brackets or alternatively a pivot point of some type.

If desired, an odor control gasket 50 may be employed adjacent the first substantially horizontal planar surface 10. Such an odor control gasket may be connected in any convenient manner such as to a scum baffle panel 70, if present.

The launder cover panel assembly may be configured to open and close independently of adjacent assemblies. If desired, a flexible material 60 may be mounted along at least a portion of a side of the launder cover panel assembly. In this manner the flexible material 60 may overlap a flexible material 60 on a second launder cover panel assembly adjacent the launder cover panel assembly. This provides further flexibility and independent adjustment of the universal adjustable launder cover panel assembly to fit various tank diameters and other shaped tank configurations. Such flexible materials may vary and be made of various polyolefin or other polymeric plastics or fibers. In some embodiments the flexible material mounted along at least a portion of a side of the launder cover panel assembly may be a brush-like material or a flexible rubber flap.

The launder cover panel assembly is typically used with a plurality of launder cover panel assemblies as part of a launder cover system. Advantageously, a system comprising a plurality of launder cover panel assemblies substantially cover the launder trough. That is, the plurality of launder cover panel assemblies are arranged such that the arced or ridged or sloped surface 20 of each is over the launder trough around the entire perimeter of the clarifier tank. The number of assemblies in such a system will vary depending upon the size of each assembly and the launder trough and tank dimensions and shape. Typically, there may be from about 20 to about 75 assemblies.

As described above, pultrusion, vacuum bagging, or other convenient methods, preferably non-spraying methods may be employed to make the launder cover assemblies described herein. In one convenient method, an uncured resin composite is placed on an open mold tool in the desired size and shape of the launder cover panel assembly. Such desired sizes and shapes of the launder cover panel assembly are described above and the materials may typically be glass fibers impregnated with a thermoset resin such as an epoxy, polyester, or polyurethane. The amount of glass fibers may vary but typically is greater than about 30% of the total material. Generally, the amount of glass fibers and resin are selected depending upon the desired properties of the launder cover assemblies. Desirable properties generally include: TENSILE STRENGTH (ASTM D-638) of at least about 12,000 psi; FLEXURAL STRENGTH (ASTM D-790) of at least about 20,000 psi; FLEXURAL MODULUS (ASTM D-790) of at least about $1.00 \times 10^6$ psi; NOTCHED IZOD IMPACT (ASTM D-256) of at least about 12 ft-lbs/in; BARCOL HARDNESS (ASTM D-2583) of at least about 40 (nominal); WATER ABSORPTION (ASTM D-570) of at most about 0.1%; and/or AVG THERMAL EXP COEFF (ASTM D-696) of no more than about an average of $15.0 \times 10'$ in/in/f.

In one embodiment the selected uncured resin composite is typically covered with a finely woven synthetic or natural fabric which will assist adding a desired surface finish and configured to be readily peeled off after curing. A thicker non-woven fabric may be added on top of the finely woven fabric. The thicker non-woven is configured to provide an escape path for evacuating air and may also absorb excess resin that could bleed out of the composite. The open mold tool, composite, finely woven fabric, and non-woven fabric configuration is then covered with a vacuum bag which vacuum bag is sealed around the edges and operatively connected to a vacuum pump. The vacuum pump is then activated to suck substantially all to all of the air out of the space between the vacuum bag and the configuration. This places the composite under atmospheric pressure (up to about 14.7 psi or typically 6-12 psi) while curing the resin. Curing may be accomplished in any convenient manner such as in an oven. When the launder cover panel assembly is fully cured the vacuum is lifted, the vacuum bag and fabrics are removed, and the launder cover is removed from the open mold tool.

While certain features and embodiments have been described in detail herein, it should be understood that the invention encompasses all modifications and enhancements within the scope and spirit of the following claims.

The invention claimed is:

1. A launder cover panel assembly for covering at least a portion of a launder trough channel of a clarifier tank having a launder wall and a weir wall defining a width of the launder trough wherein the launder cover panel assembly comprises:

a first substantially horizontal planar surface configured to be mounted to the clarifier tank;

an arced or ridged or sloped surface adjacent the substantially horizontal planar surface wherein the arced or ridged or sloped surface terminates in a second substantially horizontal planar surface wherein the arced or ridged or sloped surface is configured to cover at least a majority of the width of at least a portion of the launder trough perimeter; and wherein the launder cover panel assembly is pultruded or vacuum bagged and wherein the launder cover panel assembly comprises an odor control gasket configured to be connected to a scum baffle adjacent the first substantially horizontal planar surface.

2. The launder cover panel assembly of claim 1 wherein the first substantially horizontal planar surface configured to be mounted to the clarifier tank is configured to be mounted to the weir wall.

3. The launder cover panel assembly of claim 1 which further comprises a flexible material mounted along at least a portion of a side of the launder cover panel assembly.

4. The launder cover panel assembly of claim 3 wherein the flexible material mounted along at least a portion of a side of the launder cover panel assembly is configured to overlap a flexible material on a second launder cover panel assembly adjacent the launder cover panel assembly.

5. The launder cover panel assembly of claim 4 wherein the flexible material mounted along at least a portion of a side of the launder cover panel assembly is a brush-like material.

6. The launder cover panel assembly of claim 1 wherein the launder cover panel assembly is configured to open and close independently of adjacent assemblies.

7. The launder cover panel assembly of claim 1 wherein the launder cover panel assembly is configured for a tank diameter of from about 40 feet to about 175 feet.

8. The launder cover panel assembly of claim 1 wherein the launder cover panel assembly is configured for a launder trough width of from about 12 inches to about 36 inches.

9. The launder cover panel assembly of claim 1 wherein the assembly is configured to be substantially within a scum baffle panel.

10. The launder cover panel assembly of claim 1 wherein the assembly is configured to not interfere with any wiper mechanism.

11. The launder cover panel assembly of claim 1 wherein the assembly is free of stiffening flanges.

12. The launder cover panel assembly of claim 1 wherein the arced or ridged or sloped surface adjacent the substantially horizontal planar surface has a perimeter configured such that a plurality of said launder cover panel assemblies substantially cover the launder trough.

13. The launder cover panel assembly of claim 1 wherein the first substantially horizontal planar surface configured to be mounted to the clarifier tank is from about 10 inches to about 15 inches in length.

14. The launder cover panel assembly of claim 1 wherein the arced or ridged or sloped surface adjacent the substantially horizontal planar surface has a perimeter of from about 12 inches to about 96 inches in length.

15. The launder cover panel assembly of claim 1 wherein the second substantially horizontal planar surface is from about 0 to about 12 inches in length.

16. The launder cover panel assembly of claim 1 wherein an outer width of the assembly is from about 48 inches to about 72 inches.

17. The launder cover panel assembly of claim 1 wherein an inner width of the assembly is from about 36 to about 60 inches.

18. A launder cover panel assembly for covering at least a portion of a launder trough channel of a clarifier tank having a launder wall and a weir wall defining a width of the launder trough wherein the launder cover panel assembly comprises:
- a first substantially horizontal planar surface configured to be mounted to the clarifier tank;
- an arced or ridged or sloped surface adjacent the substantially horizontal planar surface wherein the arced or ridged or sloped surface terminates in a second substantially horizontal planar surface wherein the arced or ridged or sloped surface is configured to cover at least a majority of the width of at least a portion of the launder trough perimeter;
- and wherein the launder cover panel assembly comprises a flexible material mounted along at least a portion of a side of the launder cover panel assembly wherein the flexible material mounted along at least a portion of a side of the launder cover panel assembly is a brush-like material.

* * * * *